United States Patent
Wang et al.

(10) Patent No.: US 8,953,497 B2
(45) Date of Patent: Feb. 10, 2015

(54) MODIFIED TREE-BASED MULTICAST ROUTING SCHEMA

(75) Inventors: Kai Feng Wang, Beijing (CN); PengFei Zhu, Beijing (CN); HongXia Sun, Beijing (CN); YongQiang Wu, Beijing (CN)

(73) Assignee: STMicroelectronics (Beijing) R&D Co. Ltd., Beijing (CN)

( * ) Notice: Subject to any disclaimer, the term of this patent is extended or adjusted under 35 U.S.C. 154(b) by 336 days.

(21) Appl. No.: 13/335,480

(22) Filed: Dec. 22, 2011

(65) Prior Publication Data

US 2012/0170488 A1     Jul. 5, 2012

(30) Foreign Application Priority Data

Dec. 30, 2010   (CN) .......................... 2010 1 0624753

(51) Int. Cl.
*H04L 12/56*     (2006.01)
*H04L 12/721*    (2013.01)
*H04L 12/761*    (2013.01)

(52) U.S. Cl.
CPC ................ *H04L 45/06* (2013.01); *H04L 45/16* (2013.01)
USPC ........................................................ 370/255

(58) Field of Classification Search
CPC ......... H04L 45/06; H04L 45/16; H04L 49/15; H04L 49/45; H04L 49/254; G06F 15/7842
USPC ................................................. 370/255, 390
See application file for complete search history.

(56) References Cited

U.S. PATENT DOCUMENTS

| | | | |
|---|---|---|---|
| 7,043,250 B1* | 5/2006 | DeMartino | 455/445 |
| 2003/0191855 A1* | 10/2003 | Lee et al. | 709/239 |
| 2005/0220093 A1* | 10/2005 | Chen et al. | 370/389 |
| 2010/0111088 A1* | 5/2010 | Olofsson | 370/392 |
| 2010/0284401 A1* | 11/2010 | Beshai | 370/389 |
| 2010/0322244 A1 | 12/2010 | Dasylva et al. | |

FOREIGN PATENT DOCUMENTS

| | | |
|---|---|---|
| CN | 201947293 | 8/2011 |
| CN | 201956977 | 8/2011 |

* cited by examiner

*Primary Examiner* — Jae Y Lee
*Assistant Examiner* — Jean F Voltaire
(74) *Attorney, Agent, or Firm* — Allen, Dyer, Doppelt, Milbrath & Gilchrist, P.A.

(57) ABSTRACT

In mesh networks having multiple nodes that communicate data to and from each other, a great number of data transmissions may be initiated and carried out to get data to a proper processing node for execution. To get data where it needs to go (e.g., the proper destination node), a routing algorithm is used to define a set of rules for efficiently passing data from node to node until the destination node is reached. For the purpose of assuring that all data is properly transferred from node to node in a reasonably efficient manner, a routing algorithm may define subsets of nodes into regions and then send data via the regions. Even greater overall efficiency may be realized by recognizing specific adjacency relationships among a group of destination nodes and taking advantage of such adjacencies by rerouting data through regions other than the region in which a destination node resides.

14 Claims, 2 Drawing Sheets

MODIFIED TREE-BASED MULTICAST ROUTING SCHEMA

BACKGROUND

Mesh networking is a type of networking wherein each node in the network may act as an independent router, regardless of whether it is connected to another network or not. Mesh networks may be implemented with any number of computing entities. For example, several wireless computing devices, such as mobile smart phones, may form a mesh network. As another example, several processing components on a single integrated circuit (IC) chip or multiple ICs may form a mesh network. Such a mesh network, with multiples processing nodes and paths between nodes allows for continuous connections and reconfiguration around broken or blocked paths by using different paths for data transfer from node to node. A mesh network whose nodes are all connected to each other is a fully connected network.

One particular aspect of mesh networking has been implemented in ICs that are categorized as Very Large Scale Integration (VLSI) chips. In these ICs, a two-dimensional (2D) mesh of processing nodes may be realized on a single flat IC chip. Such multiprocessor ICs are becoming more widely utilized to efficiently use the increasing number of transistors available in modern VLSI technology. As the number of processing nodes increases, an on-chip network (i.e., a 2D mesh network) is implemented to facilitate communications and data transfer between the various processing nodes. The overall schema for facilitating this communication and data transfer is referred to as a routing algorithm or simply routing. Conventional routing for a 2D mesh network on an IC provides a very simple grid-like network which may result in short connections within the chip architecture. However, problems abound when multiple communication and data transfer paths are formed. As one node may need to broadcast data to several nodes, conventional routing algorithms are inefficient and cumbersome because some data may be duplicated in concurrent paths or parallel divergent paths even though shorter and more efficient routes may be available.

BRIEF DESCRIPTION OF THE DRAWINGS

Embodiments of the subject matter disclosed herein will become more readily appreciated as the same become better understood by reference to the following detailed description, when taken in conjunction with the accompanying drawings.

DETAILED DESCRIPTION

The following discussion is presented to enable a person skilled in the art to make and use the subject matter disclosed herein. The general principles described herein may be applied to embodiments and applications other than those detailed above without departing from the spirit and scope of the present detailed description. The present disclosure is not intended to be limited to the embodiments shown, but is to be accorded the widest scope consistent with the principles and features disclosed or suggested herein.

Prior to discussing the specific details of various embodiments, an overview of the subject matter is presented. In mesh networks having multiple nodes that communicate data to and from each other, a great number of data transmissions may be initiated and carried out to get message (e.g., data) to a proper processing node for execution. To get data where it needs to go (e.g., the proper destination nodes), a routing algorithm is used to define a set of rules for efficiently passing data from node to node until the destination node is reached. For the purpose of assuring that all data is properly transferred from node to node in a reasonably efficient manner, a routing algorithm may define subsets of nodes into regions and then send data into the regions for routing. As will be discussed in greater detail below, even greater overall efficiency may be realized by recognizing specific adjacency relationships among a group of destination nodes and taking advantage of such adjacencies by rerouting data through regions other than the region in which a destination node resides. Thus, the total level of data transfer activity may be reduced by routing similar data to adjacent destination nodes using a single path. These and other concepts are detailed further with respect to FIGS. 1-4.

Figure 1:
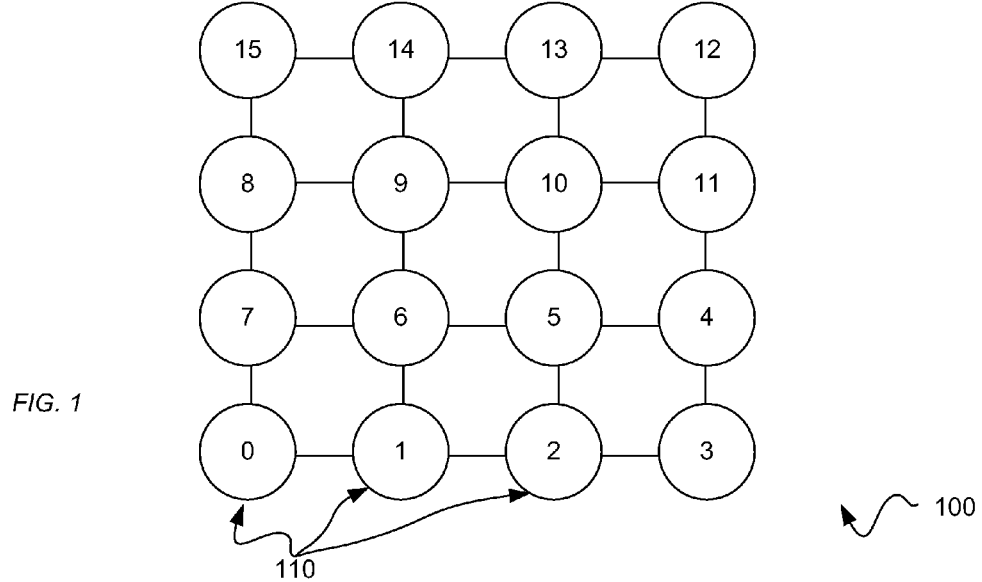
FIG. 1 is a block diagram of a 4×4 network having a mapping schema for a two-dimensional tree-based network according to an embodiment of the subject matter disclosed herein.

FIG. 1 is a block diagram of a 4×4 matrix (e.g. network) having a mapping schema for a two-dimensional tree-based network 100 according to an embodiment of the subject matter disclosed herein. In a two-dimensional tree-based network, each node 110 may be referred to by a specific identifier within the context of a mapping schema and ultimately a routing algorithm. Thus, the basis of the mapping schema inherently affects the nature of the routing algorithm based upon each node's identification.

Any given two-dimensional mesh network will have m rows and n columns. To implement tree-based multicast routing algorithm, all the nodes in the network must first identified with identification assignment function I. The function I for an m×n 2D-mesh network can be expressed in terms of the x- and y-coordinates of nodes as follows in equation:

$$I(x, y) = \begin{cases} y \times n + x; & \text{if } y \text{ is even} \\ y \times n + n - x - 1; & \text{if } y \text{ is odd} \end{cases}$$

In this mapping schema for a 4×4 network, nodes 110 may be identified as one of 16 different nodes with an identifier of 0-15. The first node in this example may be the lower left-hand node and identified as node 0. The mapping schema then identifies successive nodes to the right along the bottom row as nodes 1-3. Next the identification schema moves to the second row but stays on the right-hand side of the network for node 4. The schema moves back to the left in identifying nodes 5-7 and then similarly moves to the third row and to the right again. This pattern repeats until all nodes are identified by a unique node identifier—in this example a node identifier between 0 and 15 as shown in FIG. 1. With such a mapping schema in place, a routing algorithm may be implemented using these node identifications for data routing. Two such routing algorithms are described below with respect to FIGS. 2 and 3.

Figure 2:
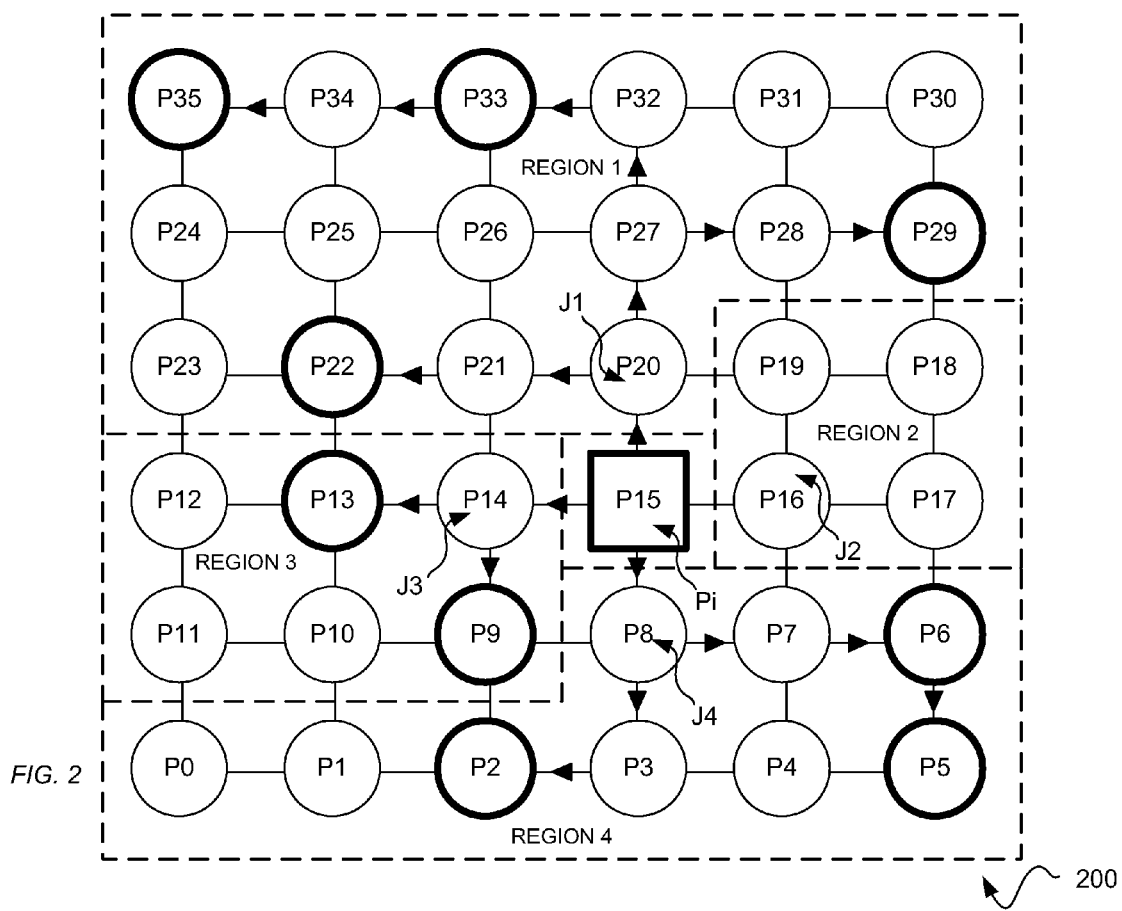
FIG. 2 is a block diagram of a 6×6 network having an unmodified routing schema for a two-dimensional tree-based network according to an embodiment of the subject matter disclosed herein.

FIG. 2 is a block diagram of a 6×6 matrix (e.g. network) 200 having a simple routing schema for a two-dimensional tree-based network according to an embodiment of the subject matter disclosed herein. For the purpose of illustration, an example scenario will be used throughout this disclosure. The example includes a source node Pi that will send a multicast message (e.g., data) to several destination nodes in the network 200. Thus, for ease of illustration, source node Pi is not an edge node and, in this example, corresponds to the node identified as P15. Such a source node Pi will necessarily have four adjacent nodes, labeled J1, J2, J3 and J4 with the label number assigned according to the identification in the mapping schema in a descending manner. That is, the node identifier determines the label, such that J1>J2>J3>J4 (e.g., for source node Pi with an identifier of P15, J1 will be the largest adjacent node identified as node P20, J2 will be node P16, J3 will be node P14 and J4 will be node P8. For this mapping schema and routing algorithm, adjacent nodes are defined as nodes directly vertical or horizontal to the source node Pi, e.g., within the same row or column and without any intervening nodes. Diagonal nodes are not considered adjacent.

With the four adjacent nodes defined as J1-J4, all other nodes may be defined as being part of a numbered region associated with one and only one adjacent node J1-J4, aptly named regions 1-4. All other nodes in the mesh network 200 are defined in regions according to the following equations:

region 1: nodes with label number between [J1, (m×n)−1];
region 2: nodes with label number between [J2, J1−1];
region 3: nodes with label number between [J4+1, J3]; and
region 4: nodes with label number between [0, J4].

When Pi receives a multicast message, it extracts the message's destination set D from the message's packet header, and then generates four new destination subsets D1, D2, D3 and D4 that correspond to destination nodes in each region. A set of rules may be as follows:

generate D1 by selecting out destination nodes within Region 1 from D, and if D1 is not null (e.g., there exists at least one destination node in the set D within Region 1), then send message to J1 with new destination set D1 information;
generate D2 by selecting out destination nodes within region 2 from D, and if D2 is not null, then send message to J2 with new destination set D2 information;
generate D3 by selecting out destination nodes within region 3 from D, and if D3 is not null, then send message to J3 with new destination set D3 information; and
generate D4 by selecting out destination nodes within region 4 from D, and if D4 is not null, then send message to J4 with new destination set D4 information.

With this set of rules in place, the appropriate messages from message set D are then sent to one on the four adjacent nodes J1 or J2 or J3 or J4. When the appropriate adjacent nodes receive the multicast message with new destination subset information, the multicast message data may be cached. If the adjacent node is the actual destination node (i.e., this node was the intended final destination of the particular data in the message set D), then that data is not required to be passed along to another destination node. However, for all other data, the process may repeat such that new regions 1-4 are defined with four new adjacent nodes and four new subsets D1, D2, D3 and D4 of the multicast message D from the perspective of a new source node. This process repeats until all data has reached its destination node. Thus, the data path for each destination node in the example shown in FIG. 2 reveals paths marked by the arrows between different nodes.

To continue with the example from above, the source node P15 may be tasked with sending a multicast message to destination node set D={P2, P5, P6, P9, P13, P22, P29, P33, P35}. Before transferring the multicast message to subsequent nodes, the source node P15 will first generate four new destination sets D1, D2, D3 and D4. For source node P15, it's four adjacent nodes J1, J2, J3 and J4 are P20, P16, P14 and P8, respectively corresponding to four regions 1-4 having respective nodes in each region as [P20-P35], [P16-P19], [P9-P14] and [P0-P8]. Thus four new destination sets D1-D4 can be calculated: D1={P22, P29, P33, P35}, D2={null}, D3={P9, P13} and D4={P2, P5, P6}.

Because destination sets D1, D3 and D4 are not null, source node P15 will transfer the message to J1, J3 and J4 with information for new destination set D1, D3 and D4. Source node P15 does not need to transfer the message to J2 because D2 is null which means that there is no destination node in region 2.

When P20, P14 or P8 each receive the respective subset (e.g., D1, D3 or D4, respectively) of the multicast message D, each of these nodes now becomes a source node tasked with sending its associated subset as a new multicast message having its respective destination sets that are determined in the same manner as discussed above. Thus, the two-step process repeats until all destination sets are null (e.g., all messages have reached their respective destination nodes).

Although the tree-based multicast routing algorithm depicted in FIG. 2 successfully transfers the multicast message D to all the appropriate destination nodes, the performance does not take advantage of the node architecture. That is, once destination nodes are placed into a destination set, the routing of the multicast message is limited to paths entirely through a single region. Thus, the number of non-destination nodes in which the multicast message must go through (i.e., the number of node transfers—"hops" as referred to throughout the remainder of this disclosure and denoted by arrows between nodes in FIG. 2) to reach all destination nodes may be greater even though some destination nodes are adjacent to each other, but in different initial regions.

Consider the example in FIG. 2, destination nodes P2 and P9 as well as destination nodes P13 are P22 are examples of pairs of adjacent destination nodes that occur in different regions (with respect to the original source node Pi). Destination nodes P2 and P9 are in regions 4 and 3, respectively. Similarly, destination nodes P13 and P22 are in regions 3 and 1, respectively. Thus, with regard to a comparison of destination nodes P13 and P22, destination node P22 will receive the multicast message D from node P21, and P13 will receive the multicast message D from P14 via two hops. In order to reach destination node P22, the multicast message D must be undergo three hops through nodes P20 and P21 from source node P15 even though nodes P20 and P21 are not destination nodes. Therefore, a total of five hops are needed to get the multicast message to these two adjacent nodes (P13 and P22) with somewhat redundant and parallel paths. In fact, higher performance can be gained by enabling destination node P22 to receive the multicast message D directly from destination node P13. Transferring the multicast message D from node P13 to node P22 only needs one hop while transferring the multicast message D from node P20 to node P21 to node P22 requires two hops. An analysis of the number of hops in the routing algorithm illustrated in FIG. 2 reveals a total number of 19. Thus, a more efficient routing algorithm may be realized by recognizing adjacent destination nodes in different regions as discussed below with respect to FIG. 3.

Figure 3:
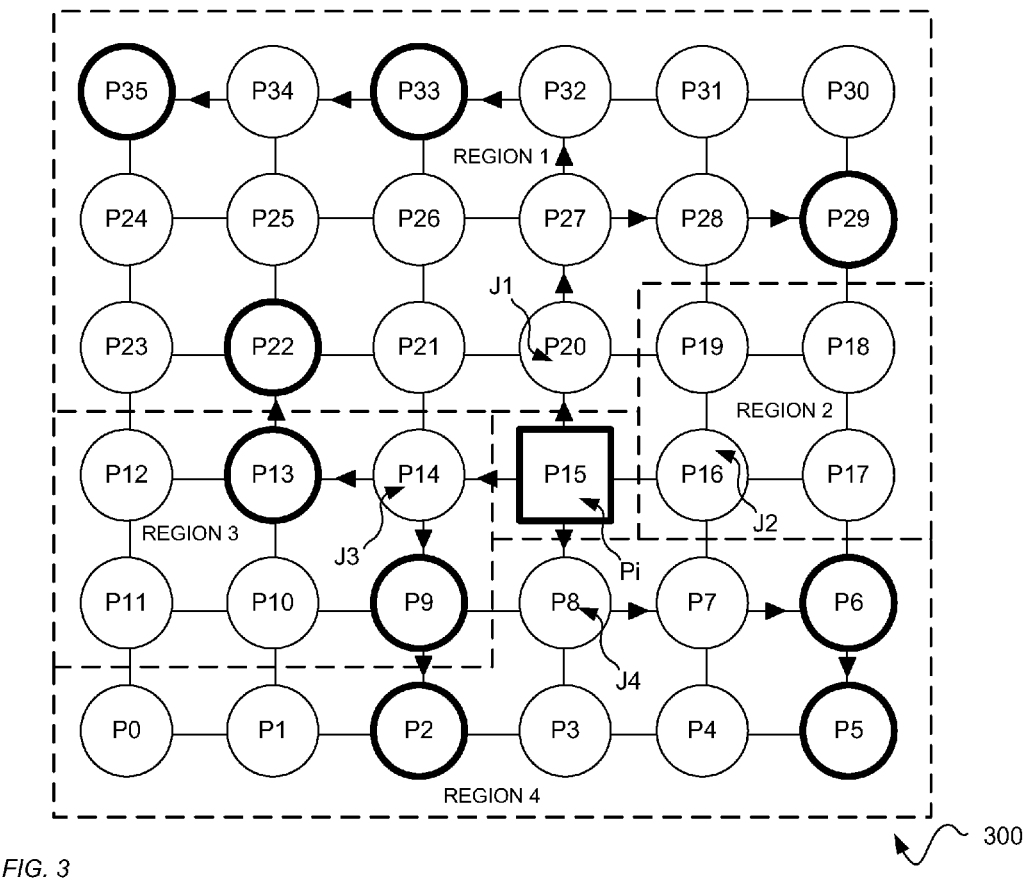
FIG. 3 is a block diagram of a 6×6 network having a modified routing schema for a two-dimensional tree-based network according to an embodiment of the subject matter disclosed herein.

FIG. 3 is a block diagram of a 6×6 network 300 that uses a modified routing algorithm for data communication in a two-dimensional tree-based network according to an embodiment of the subject matter disclosed herein. The routing algorithm example illustrated in FIG. 3 enables direct communication between adjacent destination nodes in different regions. Thus, efficiency may be realized in that the total number of hops using the algorithm illustrated in FIG. 3 is only 17, which is less than the 19 hops needed using the routing algorithm illustrated in FIG. 2. This can be accomplished by adding an additional step in determining the destination subsets at the first pass of analyzing the multicast message D from the source node Pi.

As before, when Pi received a multicast message, it extracts the message's destination set D (D={P2, P5, P6, P9, P13, P22, P29, P33, P35}) from the message's packet header, and then generates four new destination sets D1, D2, D3 and D4 that correspond to destination nodes in each region. The same set of rules as before apply:

Generate D1 by selecting out destination nodes within Region 1 from D, and if D1 is not null (e.g., there exists at least one destination node in the set D within Region 1), then send message to J1 with new destination set D1 information;

Generate D2 by selecting out destination nodes within region 2 from D, and if D2 is not null, then send message to J2 with new destination set D2 information;

Generate D3 by selecting out destination nodes within region 3 from D, and if D3 is not null, then send message to J3 with new destination set D3 information; and Generate D4 by selecting out destination nodes within region 4 from D, and if D4 is not null, then send message to J4 with new destination set D4 information.

Next, an analysis of the destination nodes is performed to determine if any destination nodes exist that are adjacent to each other and in different regions. According to this new step in this routing algorithm, there may be nodes in region 1 are adjacent to region 2, there may be nodes in region 1 are adjacent to region 3, and there may be nodes in region 3 are adjacent to region 4 and there may be nodes in region 3 are adjacent to region 4. In reviewing the multicast message destination set D, by definition region 1 can never have any nodes adjacent to nodes in region 4, and region 2 can never have any nodes adjacent to nodes in region 3. Thus, all edge nodes between different regions that are also destination nodes are named destination edge nodes (DEN). Thus, in this example, determining the destination edge node set comprises:

for region 1, the edge nodes to region 2 is $DEN_{1,2}=\{P_{29}\}$, and the edge nodes to region 3 is $DEN_{1,3}=\{P_{22}\}$;

for region 2, the edge nodes to region 1 is $DEN_{2,1}=\{\ \}$, and the edge nodes to region 4 is $DEN_{2,4}=\{\ \}$;

for region 3, the edge nodes to region 1 is $DEN_{3,1}=\{P_{13}\}$, and the edge nodes to region 4 is $DEN_{3,4}=\{P_9\}$; and for region 4, the edge nodes to region 1 is $DEN_{4,2}=\{P_6\}$, and the edge nodes to region 3 is $DEN_{4,3}=\{P_2\}$.

Next, the process may change destination nodes from one region to another (e.g., move the destination nodes from destination set D1 to D2, for example) based upon a comparison of the number of hops required for the adjacent destination node. Looking at the destination edge node set $DEN_{1,2}$, $DEN_{1,3}$, $DEN_{2,1}$, $DEN_{2,4}$, $DEN_{3,1}$, $DEN_{3,4}$, $DEN_{4,2}$ and $DEN_{1,2}$, pairs of adjacent destination nodes, referred to as destination edge adjacent pairs (DEAP). In the example illustrated in FIG. 3, the destination edge adjacent pairs set is DEAP={{P13, P22}, {P2, P9}}.

If DEAP is null, then the algorithm does not change any destination set (D1, D2, D3 or D4) and all multicast messages are routed the same as illustrated above with respect to the example of FIG. 2. However, if DEAP is not null, for each adjacent node pair, a comparison of the number of hops is made for each node in the identified pair. This may be done by calculating the x-y distance from source node Pi for each adjacent destination node in the pair. For example, for P13 and P22, the x-y distance (i.e., hops) is two and three respectively. Therefore, it would be more efficient to provide the multicast message D to destination node P22 via destination node P13 because the total number of hops is reduced to three from five. Thus, the destination node P22 is moved from destination set D1 to destination set D3. Similarly, destination node P2 is moved from destination set D4 to destination D3. The resulting modified destination sets become: D1={P29, P33, P35}, D2={null}, D3={P2, P9, P13, P22} and D4={P5, P6}.

Such a modified routing algorithm is advantageous because fewer resources are used to route the multicast message D across a mesh network 300. In the unmodified algorithm that does not take advantage of adjacent destination nodes, the total number of hops is 19 as illustrated in the example of FIG. 2. Using a modified routing algorithm that does take advantage of adjacent destination nodes, the total number of hops is reduced to 17. A reduction in hops means a reduction in resources and power used to transfer data to and from different nodes in the mesh network. This can be particularly advantageous for processing cores, multi-core processors, and processors disposed on integrated circuits. Further, any computer network may benefit from a reduction in traffic between nodes by using such a modified routing algorithm. Further yet, even though the examples illustrated with respect to FIGS. 2 and 3 apply to a two-dimensional mesh network, the same principles may be applied to three-dimensional networks or multidimensional networks so long as a definition of "adjacent node" is maintained throughout the routing algorithm. Any number of contexts may exist in which a modified routing algorithm that takes advantage of adjacent destination nodes may be realized. One such example is shown in FIG. 4.

Figure 4:
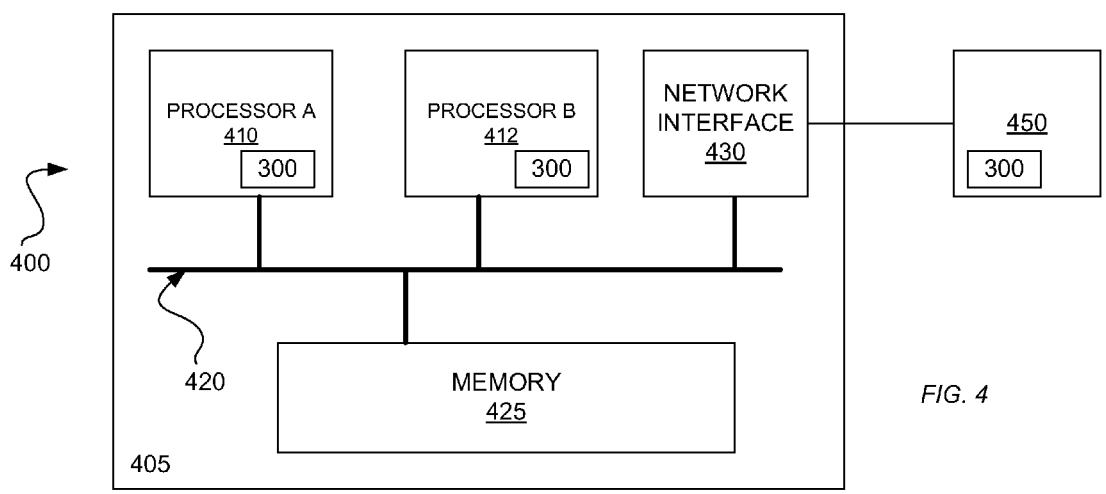
FIG. 4 is a block diagram of an embodiment of a computer system 400 that may implement the mesh network system 300 of FIG. 3.

FIG. 4 is a block diagram of an embodiment of a computer system 400 that may implement one or more mesh network systems 300 of FIG. 3. In this system embodiment, the system 400 may include a computing device 405 having a first processor 410 and a second processor 412 coupled to a local memory 415 through a system bus. Each processor 410 and 412 may include a mesh network 300 as discussed above with respect to FIG. 3. Each processor 410 and 412 may be operable to control the memory 415 and each respective mesh network 300 in transferring data to and from the components (e.g., nodes) within the mesh network 300 and to and from the memory 415. Further, additional data stores and communication channels, such as through a network interface 430, may be used to transfer data to and from the mesh network 300 that may be part of a remote computing device 450.

In still further embodiments, each computing device 405 and 450 may also be considered a node within the context of a larger mesh network (not shown) such that each larger "computing device" node may be considered a third dimension in relation to the two-dimensional mesh networks 300 within processors of each computing device 405 and 450. Further yet, each mesh network 300 may comprise a single integrated circuit die or multiple integrated circuits dies.

While the subject matter discussed herein is susceptible to various modifications and alternative constructions, certain illustrated embodiments thereof are shown in the drawings and have been described above in detail. It should be understood, however, that there is no intention to limit the claims to the specific forms disclosed, but on the contrary, the intention is to cover all modifications, alternative constructions, and equivalents falling within the spirit and scope of the claims.

What is claimed is:

1. A method, comprising:
   determining a multicast message to send to a plurality of destination nodes in a mesh network from a source node in the mesh network, the mesh network comprising a plurality of nodes arranged in rows and columns;
   for each destination node, determining a region among a plurality of regions to be associated with a respective destination node;
   identifying pairs of destination nodes that are adjacent to each other in different regions;
   for each pair, determining the more efficient data transmission path from the source node; and
   changing the region associated with the destination node in the pair determined to not be associated with the more efficient data transmission path;
   wherein four nodes, J1, J2, J3, and J4, adjacent to the source node are defined by two adjacent nodes in the same row as the source node and two adjacent nodes in the same column as the source node, and wherein the identification associated with each adjacent comprises values that follow J1>J2>J3>J4.

2. The method of claim 1 wherein the more efficient data transmission path comprises a data transmission path having fewer intermediate nodes between the source node and the destination node.

3. The method of claim 1, further comprising caching data at each node receiving the multicast message.

4. The method of claim 1, further comprising generating subsets of destination nodes associated with each determined region.

5. The method of claim 1, further comprising:
   determining if a region includes a destination node and if so, transmitting the multicast message to the closest node in the region;
   defining the closest node as a new source node;
   determining a subset of destination nodes to send the multicast message to from the new source node;
   for each destination node, determining a new region among a plurality of new regions to be associated with a respective destination node;
   identifying pairs of destination nodes that are adjacent to each other in different new regions;
   for each pair, determining the more efficient data transmission path from the new source node; and
   changing the new region associated with the destination node in the pair determined to not be associated with the most efficient data transmission path.

6. A processor, comprising:
   a plurality of nodes arranged in rows and columns in a mesh network configured to send and receive data according to a routing algorithm comprising:
   determining a source node and a plurality of destination nodes to receive data from the source node;
   associating each destination node with one of a plurality of regions;
   calculating which region is the more efficient region for the data to be transferred from the source node only if a destination node in one region is adjacent to a destination node from another;
   associating the adjacent destination nodes in different regions with the region that is more efficient; and
   transmitting the data to all destination nodes;
   the processor further comprising four nodes, J1, J2, J3, and J4, adjacent to the source node defined by two adjacent nodes in the same row as the source node and two adjacent nodes in the same column as the source node, wherein the identification associated with each adjacent comprises values that follow J1>J2>J3>J4.

7. The processor of claim 6 wherein the plurality of regions comprises four regions defined by each node's identification in relation to the identification of the source node, wherein:
   region 1 comprises nodes with an identification between [J1, (m×n)−1];
   region 2: nodes with label number between [J2, J1−1];
   region 3: nodes with label number between [J4+1, J3]; and
   region 4: nodes with label number between [0, J4].

8. The processor of claim 6, wherein the plurality of nodes are implemented in a single integrated circuit die.

9. The processor of claim 6, wherein the plurality of nodes are implemented across a plurality of different integrated circuit dies.

10. A system, comprising:
    a plurality of processing nodes in a mesh network arranged in rows and columns and configured to transmit data from a first node to a plurality of other nodes according to a routing algorithm wherein the algorithm comprises:
    associating each node other than the first node with one of a plurality of regions;
    determining if a node in one region is adjacent to a node in another region, and if so, calculating which region is the more efficient region for the data to be transferred from the first node;
    associating the adjacent nodes in different regions with the region that is more efficient; and
    transmitting the data to the nodes;
    wherein four nodes, J1, J2, J3, and J4, adjacent to the source node are defined by two adjacent nodes in the same row as the source node and two adjacent nodes in the same column as the source node, and wherein the identification associated with each adjacent comprises values that follow J1>J2>J3>J4.

11. The system of claim 10 wherein each node comprises a computing device having at least one processing entity.

12. The system of claim 10 wherein each node comprises a second level of a two-dimensional mesh network, each second level mesh network configured to route data according to the routing algorithm.

13. The system of claim 10, further comprising a memory coupled to at least one node from among the plurality of nodes through a bus.

14. The system of claim 10, wherein the plurality of nodes are coupled to each other through a multi-level computing network.

* * * * *